(No Model.) 2 Sheets—Sheet 1.
J. STEFFENSON & M. CHRISTENSEN.
GATE.
No. 541,579. Patented June 25, 1895.
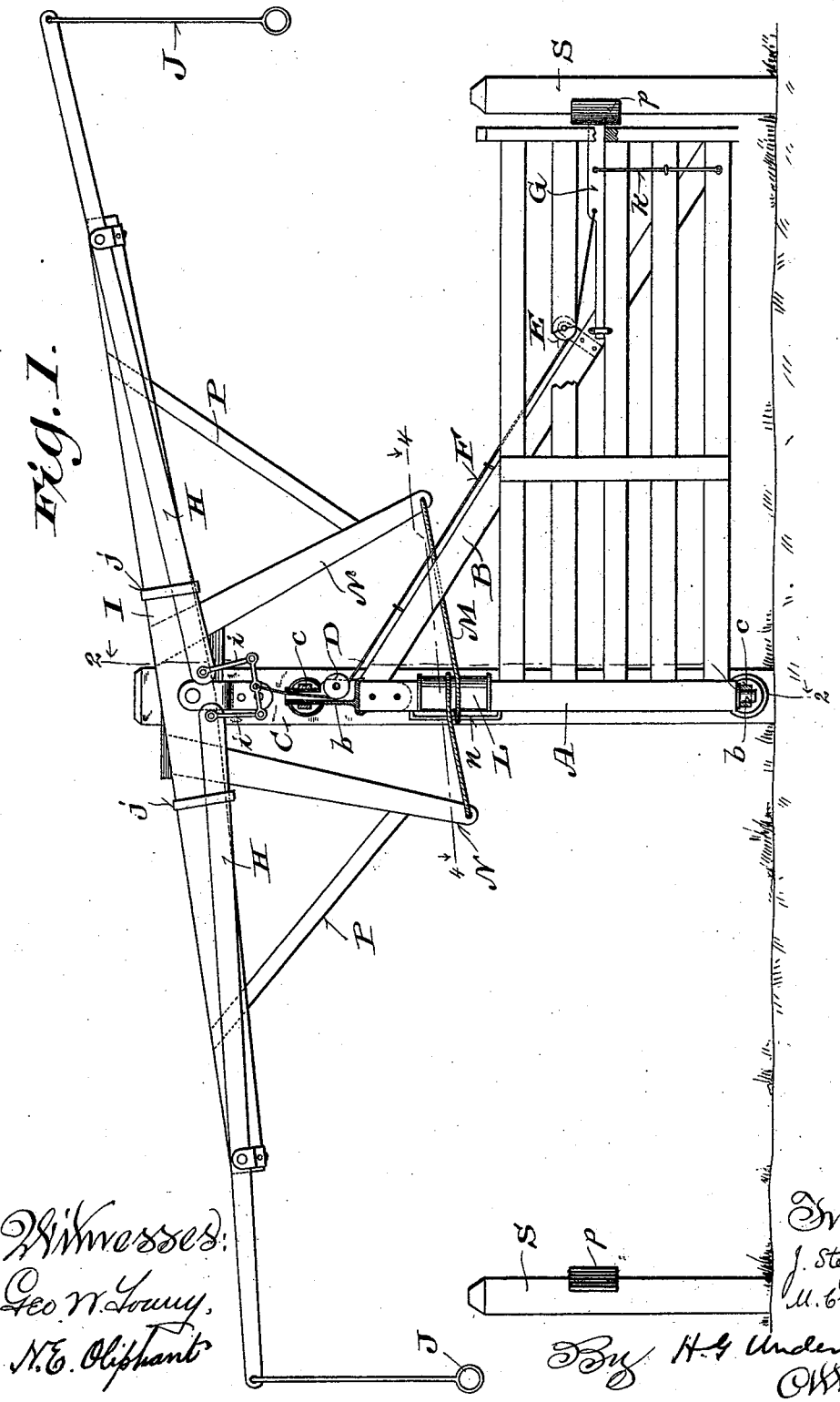
Witnesses:
Geo. W. Lowry,
N. E. Oliphant
Inventors
J. Steffenson
M. Christensen
By H. G. Underwood
Attorney (No Model.) 2 Sheets—Sheet 2.
J. STEFFENSON & M. CHRISTENSEN.
GATE.
No. 541,579. Patented June 25, 1895.
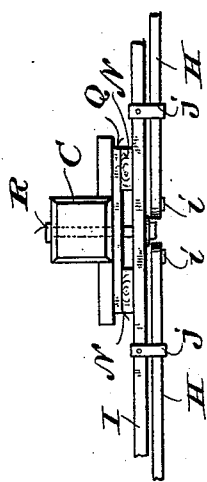
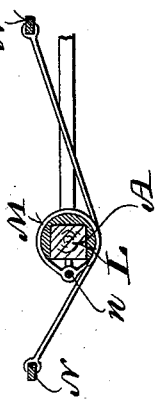
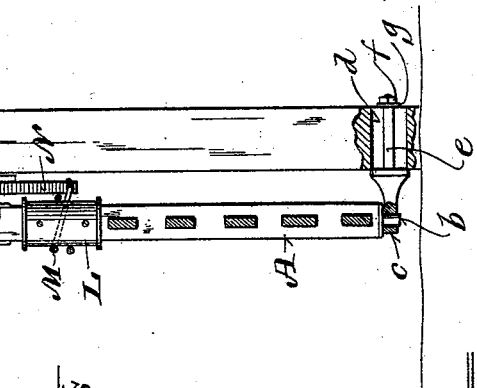
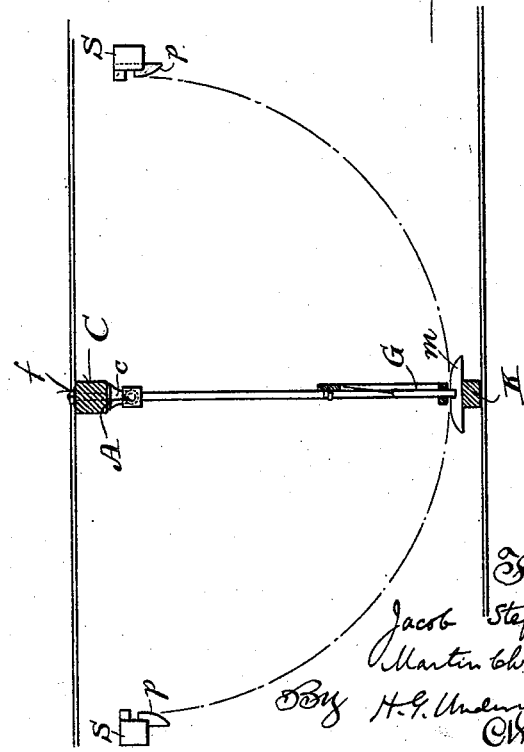
Witnesses:
Geo. W. Touny.
N. E. Oliphant
Inventors
Jacob Steffenson
Martin Christensen
By H. G. Underwood
Attorneys

UNITED STATES PATENT OFFICE.

JACOB STEFFENSON AND MARTIN CHRISTENSEN, OF RAYMOND, WISCONSIN.

GATE.

SPECIFICATION forming part of Letters Patent No. 541,579, dated June 25, 1895.

Application filed April 17, 1895. Serial No. 546,062. (No model.)

*To all whom it may concern:*

Be it known that we, JACOB STEFFENSON and MARTIN CHRISTENSEN, citizens of the United States, and residents of Raymond, in the county of Racine and State of Wisconsin, have invented certain new and useful Improvements in Gates; and we do hereby declare that the following is a full, clear, and exact description thereof.

Our invention has for its object to provide a simple, economical gate of that class that may be operated at a distance therefrom; and it consists in certain peculiarities of construction and combination of parts hereinafter set forth with reference to the accompanying drawings and subsequently claimed.

In the drawings, Figure 1 represents a view of our gate and operating mechanism, the gate appearing swung open; Fig. 2, a sectional view taken on line 2 2 of the preceding figure; Fig. 3, a detail plan view illustrating a lever mechanism constituting part of our invention; Fig. 4, a detail horizontal section on a plane indicated by line 4 4 in the first figure, and Fig. 5 a diagram illustrating the gate and posts.

Referring by letter to the drawings A represents the inner stile of a gate, this stile being extended some distance above the remainder of the gate, and an oblique bar B constituting part of said gate serves as a brace for the extended portion of said stile.

The gate-stile A is provided with pintles $b$ that engage eye-bosses $c$ connected to a main post C, the lower boss being preferably adjustable in the post to vary the altitude of the gate. In order to provide for the desired adjustment, the upper gate-pintle is of suitable length and the post C is provided with a vertical slot $d$ engaged by the shank $e$ of the lower eye-boss $c$, the latter being held in its adjusted position by a clamping-nut $f$ run on said shank against a washer $g$ that faces said post. This provision for vertical adjustment of the gate will be found valuable when snow is on the ground.

The upper pintle on the gate-stile A is hollow and has a pulley D journaled therein. Another pulley E is hung on the main portion of the gate, and a cord or analogous flexible runner F, connected to a spring-controlled sliding latch G of said gate, is strung under said pulleys and up through the hollow pintle to connect with a yoke $h$ in pivotal union with oscillative hangers $i$ at the inner ends of levers H, these levers being pivoted to the extremities of a bar I that constitutes part of a frame having tilting connection with the main post C, above specified.

The levers H work in guides $j$ on the bar I, and these guides limit the play of said levers. Depending from the outer ends of the levers are handles J and by operating either handle the latch G will be drawn against the resistance of its controlling spring $k$ to come out of the catch $m$ on a post K on the opposite side of the gateway from the main post.

Above the upper gate-bar the stile A is provided with a half-round bearing block L, and centered on said stile by a stay-pin $n$ is a chain or analogous flexible runner M that crosses itself on the bearing block to extend in opposite directions therefrom. The extremities of the flexible runner M connect with arms N that depend from the bar I above specified, and braces P connect said bar and its depending arms to stiffen the latter. A stay-piece Q is joined to the arms N parallel to the bar I, and this assemblage of parts constitutes the tilting-frame, the latter being centered on a pivot-rod R that extends laterally from the main post C in the direction of the gateway.

Posts S provided with catches $p$ are arranged in opposite directions from the main post C parallel to the approaches to the gate and when the latter is swung open in either direction the sliding spring-controlled latch G automatically engages with one of said latches to hold said gate full open.

From the foregoing it will be readily understood that the operation of a lever H not only withdraws the gate-latch from any of the catches with which it may be engaged but also causes a movement of the tilting-frame that partially rotates the stile A, through the medium of the crossed flexible runner M that works on the bearing-block N, whereby the gate is swung open or closed. Assuming that the gate is closed, a pull on one of the levers will swing it open ahead of the operator, and a subsequent pull on the other lever will swing said gate back to its normal or closed position.

Having thus described our invention, what we claim as new, and desire to secure by Letters Patent, is—

1. The combination of a hinged gate having a spring-controlled latch, a flexible runner centered and crossed on the hinge-stile of the gate, a tilting-frame on the hinge-post of said gate joined to the extremities of the flexible runner, latch-operating levers in pivotal connection with the tilting-frame, and stops arranged on said frame to limit play of the levers.

2. The combination of a hinged gate having a spring-controlled latch, a flexible runner centered and crossed on the hinge stile of the gate, a tilting-frame on the hinge-post of said gate joined to the extremities of the flexible runner, pulleys arranged on the aforesaid gate, levers in pivotal connection with the tilting-frame, oscillative hangers at the inner ends of the levers, a yoke in pivotal connection with the hangers, and another flexible runner trained on said pulleys to connect the gate-latch with said yoke.

3. The combination of a post, a gate having a stile thereof in vertically adjustable connection with the post, a spring-controlled latch on the gate, a flexible runner centered and crossed on said gate-stile, a tilting-frame on said post joined to the extremities of the flexible runner, latch operating levers in pivotal connection with the tilting-frame, and stops arranged to limit play of the levers.

4. The combination of a gate and its posts, other posts along the approaches to the gateway in line with the hinge-post of the gate, catches on all but said hinge-post, a spring-controlled latch on the gate, a flexible runner centered and crossed on the hinge-stile of said gate, a tilting frame on the aforesaid hinge-post joined to extremities of the flexible runner, a spring-controlled latch on the aforesaid gate, and latch-operating levers in pivotal connection with the tilting-frame.

In testimony that we claim the foregoing we have hereunto set our hands, at Raymond, in the county of Racine and State of Wisconsin, in the presence of two witnesses.

JACOB STEFFENSON.
MARTIN CHRISTENSEN.

Witnesses:
J. H. KAMPER,
K. M. CHRISTENSEN.